(12) United States Patent
Sengoku et al.

(10) Patent No.: US 10,508,927 B2
(45) Date of Patent: Dec. 17, 2019

(54) NAVIGATION SERVER, NAVIGATION CLIENT AND NAVIGATION SYSTEM

(71) Applicant: HONDA MOTOR CO., LTD., Tokyo (JP)

(72) Inventors: Koji Sengoku, Tokyo (JP); Yuji Takeuchi, Tokyo (JP); Shunsuke Hazama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 343 days.

(21) Appl. No.: 15/295,231

(22) Filed: Oct. 17, 2016

(65) Prior Publication Data

US 2017/0115128 A1    Apr. 27, 2017

(30) Foreign Application Priority Data

Oct. 23, 2015 (JP) .................. 2015-209417

(51) Int. Cl.
*G01C 21/36* (2006.01)
(52) U.S. Cl.
CPC .............................. *G01C 21/3617* (2013.01)
(58) Field of Classification Search
CPC ................................................ G01C 21/3617
USPC ....................................................... 701/424
See application file for complete search history.

(56) References Cited

U.S. PATENT DOCUMENTS

| | | | | |
|---|---|---|---|---|
| 5,633,622 A * | 5/1997 | Patterson | ................. | G07C 5/04 340/309.8 |
| 5,880,958 A * | 3/1999 | Helms | ................... | G08G 1/202 340/991 |
| 5,924,075 A * | 7/1999 | Kanemitsu | .......... | G01C 21/343 701/426 |
| 6,317,668 B1 * | 11/2001 | Thibault | ................ | G07C 5/008 701/24 |
| 6,629,034 B1 * | 9/2003 | Kozak | ................ | G01C 21/3484 340/994 |

(Continued)

FOREIGN PATENT DOCUMENTS

| JP | 2004-054770 A | 2/2004 |
|---|---|---|
| JP | 2005-201674 A | 7/2005 |

(Continued)

OTHER PUBLICATIONS

Japanese Office Action issued in corresponding Japanese Patent Application No. 2015-209417 dated Oct. 2, 2018.

*Primary Examiner* — Anne M Antonucci
*Assistant Examiner* — James E Stroud
(74) *Attorney, Agent, or Firm* — Squire Patton Boggs (US) LLP

(57) ABSTRACT

A navigation server and the like are provided which can provide to a user more meaningful information that takes into consideration a movement history of the user. Positions of a moving body X at time points of switching between an operation ON state and an operation OFF state are extracted as "first designated locations" from among a chronological order of positions (probe information) of the moving body X transmitted from a navigation client 2. A designated location is extracted from among the first designated locations of the moving body X based on a requirement that the designated location is outside a base area of the moving body X. The designated location is then stored and held in, or registered in, a server storage device 10.

7 Claims, 7 Drawing Sheets

(56) References Cited

U.S. PATENT DOCUMENTS

| | | | | |
|---|---|---|---|---|
| 6,714,857 B2* | 3/2004 | Kapolka | | G08G 1/20 |
| | | | | 340/902 |
| 6,807,481 B1* | 10/2004 | Gastelum | | G01C 21/3697 |
| | | | | 340/438 |
| 7,117,075 B1* | 10/2006 | Larschan | | G06Q 10/06 |
| | | | | 701/29.6 |
| 7,734,287 B2* | 6/2010 | Ying | | G05B 15/02 |
| | | | | 340/514 |
| 7,856,311 B2* | 12/2010 | Matsuura | | G01C 21/3679 |
| | | | | 701/424 |
| 8,140,358 B1* | 3/2012 | Ling | | G06Q 40/08 |
| | | | | 705/4 |
| 8,339,251 B2* | 12/2012 | Roberts, Sr. | | G06F 17/00 |
| | | | | 340/431 |
| 8,442,508 B2* | 5/2013 | Harter | | G06Q 10/08 |
| | | | | 455/419 |
| 8,626,568 B2* | 1/2014 | Warkentin | | G06Q 10/0639 |
| | | | | 705/7.38 |
| 8,718,536 B2* | 5/2014 | Hannon | | B60K 35/00 |
| | | | | 455/1 |
| 8,930,229 B2* | 1/2015 | Bowne | | G06Q 10/0639 |
| | | | | 705/4 |
| 8,949,312 B2* | 2/2015 | McLoughlin | | G06F 8/658 |
| | | | | 709/203 |
| 9,014,906 B2* | 4/2015 | Mohn | | G08G 1/00 |
| | | | | 701/29.1 |
| 9,245,391 B2* | 1/2016 | Cook | | G06Q 10/10 |
| 9,311,271 B2* | 4/2016 | Wright | | G07C 5/008 |
| 9,934,619 B2* | 4/2018 | Brands | | G07B 15/063 |
| 9,944,282 B1* | 4/2018 | Fields | | G05D 1/0055 |
| 10,056,008 B1* | 8/2018 | Sweany | | G09B 19/167 |
| 10,083,493 B1* | 9/2018 | Davis | | G06Q 50/30 |
| 10,093,322 B2* | 10/2018 | Gordon | | B60W 50/0097 |
| 10,097,615 B1* | 10/2018 | Preissl | | H04L 67/12 |
| 10,121,203 B2* | 11/2018 | Christensen | | G06Q 40/08 |
| 10,140,782 B2* | 11/2018 | Binion | | G07C 5/008 |
| 2002/0150050 A1* | 10/2002 | Nathanson | | G07C 5/008 |
| | | | | 370/241 |
| 2002/0152115 A1* | 10/2002 | Morita | | G06Q 30/02 |
| | | | | 705/13 |
| 2003/0182033 A1* | 9/2003 | Underdahl | | B60R 25/00 |
| | | | | 701/31.4 |
| 2013/0059607 A1* | 3/2013 | Herz | | H04L 67/20 |
| | | | | 455/456.3 |
| 2019/0049262 A1* | 2/2019 | Grimm | | G01C 21/3484 |

FOREIGN PATENT DOCUMENTS

| | | |
|---|---|---|
| JP | 3722444 B2 | 11/2005 |
| JP | 2008-164420 A | 7/2008 |
| WO | WO 2004/075137 A1 | 9/2004 |
| WO | 2009/060538 A1 | 5/2009 |
| WO | 2012/056526 A1 | 5/2012 |

* cited by examiner

NAVIGATION SERVER, NAVIGATION CLIENT AND NAVIGATION SYSTEM

BACKGROUND OF THE INVENTION

Field of the Invention

The present invention relates to a navigation server that, based on communication with navigation clients as respective mobile stations among a plurality of mobile stations, supports movement of each mobile station.

Description of the Related Art

Technology has been proposed that extracts as a reference section a place at which a user stopped at a frequency exceeding a certain frequency from a movement history of the user, and also extracts therefrom, as a visiting section, a place which is separated by a certain distance from the reference section, and provides information relating to the visiting section (Japanese Patent No. 3722444). Thereby, based on movement histories of other users, useful information that includes almost no unnecessary information (noise) is provided to a single user that is moving in an unfamiliar area.

Technology has also been proposed that associates and stores past travelling starting locations and travelling ending locations of a vehicle, identifies locations at which route guidance is unnecessary based on the present position of the vehicle and the stored information, and restricts the display of the identified locations in a list of destination candidates (see Japanese Patent Laid-Open No. 2008-164420). Thereby the convenience of a destination search operation can be improved.

SUMMARY OF THE INVENTION

However, because matters of interest to a user fluctuate due to various factors such as the passage of time, in some cases meaningful information is not provided to the user as a result of an attempt to reduce noise included in information.

Thus, a technical problem to be solved by the present invention is to provide a navigation server and the like that can provide to a user more meaningful information that takes into consideration the movement history of the user.

A navigation server of the present invention comprises: a server storage device; a first server arithmetic processing element configured to receive a chronological order of positions and operating states of a moving body in which a navigation client is mounted from the navigation client, and to extract a position of the moving body at a time point of switching between an operation ON state and an operation OFF state from the chronological order of positions of the moving body as a first designated location; and a second server arithmetic processing element configured to extract as a designated location of the moving body, a location satisfying a requirement of being outside of a base area that is specific to the moving body from the first designated locations extracted by the first server arithmetic processing element, and thereafter cause the designated location to be stored in the server storage device.

A navigation client of the present invention is a navigation client which is mounted in a moving body and which is configured to recognize a chronological order of positions as well as operating states of the moving body, and to transmit to a navigation server, in a distinguishable form, a position at a time point of switching between an operation ON state and an operation OFF state of the moving body and positions at other time points.

A navigation system of the present invention is constituted by the navigation server and the navigation client.

According to the navigation server, navigation client and navigation system (hereunder, referred to as "navigation server and the like") of the present invention, a position of a moving body at a time point of switching between an operation ON state and an operation OFF state is extracted as a first designated location from among a chronological order of positions of the moving body that is transmitted from a navigation client. When the moving body was switched from an operation ON state to an operation OFF state, the probability that immediately thereafter a user of the moving body stopped off at the location or an area in the vicinity thereof is high. That is, there is a high probability that the location is a movement-pausing location or a destination location. In a case where the moving body was switched from an operation OFF state to an operation ON state, there is a high probability that until immediately prior thereto, the user of the moving body had been stopping off at that location or in an area in the vicinity thereof. That is, there is a high probability that the relevant location is a movement starting location or a departure location. Therefore, by extracting the first designated locations, it is possible to identify with high accuracy a location at which the moving body or the user thereof stopped off.

Further, after a designated location is extracted from among the first designated locations of the moving body based on the requirement that the designated location is outside a base area of the moving body, the designated location is stored and held or registered in the server storage device. By designating an area which includes a location which the user stops off on a daily basis or frequently as a base area, the positions of locations which the user stops off at on a non-daily or occasional basis are registered as designated locations. Thereby, in a situation where a designated location is set as a new destination and a route search is performed or the like, the usefulness of information relating to the relevant designated location for the user can be improved.

In the navigation server and the like as one aspect of the present invention, the first server arithmetic processing element is configured to recognize as the base area, based on the chronological order of positions of the moving body received from the navigation client, a first base area which includes a location in which a passing frequency of the moving body is equal to or greater than a first threshold value and a second base area which includes a location in which a visiting frequency of the moving body is equal to or greater than a second threshold value.

According to the navigation server and the like having the foregoing configuration, taking into consideration a fact that there is a high probability that a location with respect to which a passing frequency or a visiting frequency of a moving body is high is a location which the user stops off on a daily basis or frequently, there is a high probability that the position of a location which the user stops off on a non-daily or occasional basis will be registered as a designated location. Thereby, the usefulness of information relating to the designated location for the user can be improved.

In a case where, taking into consideration the chronological order of positions of a moving body or an operating state thereof (a fact that an operating state is continuing), there is a high probability that the moving body passed a certain location, the passing frequency of the moving body with respect to the relevant location is increased cumulatively. On the other hand, in a case where there is a high probability that the moving body stopped at a certain location when taking into consideration the chronological order of positions of the moving body or an operating state thereof (a fact that switching between an operation ON state and an operation OFF state occurred), the passing frequency of the moving body with respect to the relevant location is increased cumulatively.

In the navigation server and the like as one aspect of the present invention, the first server arithmetic processing element is configured to recognize the base area under at least one condition of a condition that the first threshold value is lower than the second threshold value and a condition that the first base area is narrower than the second base area.

According to the navigation server and the like having the above described configuration, it is easier for a base area that is based on a certain location to be actualized in a case where a visiting frequency of a user at the certain location is higher than a passing frequency of the user at the certain location. Instead of the foregoing or in addition thereto, a narrow base area is actualized in a case where the passing frequency of the user at the certain location is higher in comparison to a case where the visiting frequency of the user at the certain location is higher. Therefore, in a case where a user occasionally stops off at a location that is separated by only a short distance from a location which is merely a location that the user passes on a daily basis, the possibility of the position of the location which the user occasionally makes stops off being excluded from designated locations, can be decreased.

In the navigation server and the like as one aspect of the present invention, the server storage device is configured to store a second designated location that is designated by a user of the navigation client in addition to the designated location of the moving body, and the second server arithmetic processing element is configured to extract the designated location based on a further requirement that the designated location is not stored as either one of the designated location and the second designated location by the server storage device.

According to the navigation server and the like having the above described configuration, in a case where a first designated location is already registered in the server storage device as either one of a designated location and a second designated location, the first designated location is not extracted as a designated location. Thereby, a situation in which an existing designated location and a second designated location that has already been designated by a user, and a new designated location are registered in duplicate in the server storage device, is avoided.

In the navigation server and the like as one aspect of the present invention, the second server arithmetic processing element is configured to cause the navigation client or an information terminal other than the navigation client to output the designated locations, and thereafter cause the designated location to be selected, and to cause the designated location that is selected to be stored in the server storage device as a second designated location of the moving body.

According to the navigation server and the like having the foregoing configuration, convenience can be improved when a user utilizes information relating to a designated location through the navigation client or an information terminal other than the navigation client (may also be the navigation server itself).

DETAILED DESCRIPTION OF THE PREFERRED EMBODIMENTS (Configuration)

Figure 1:
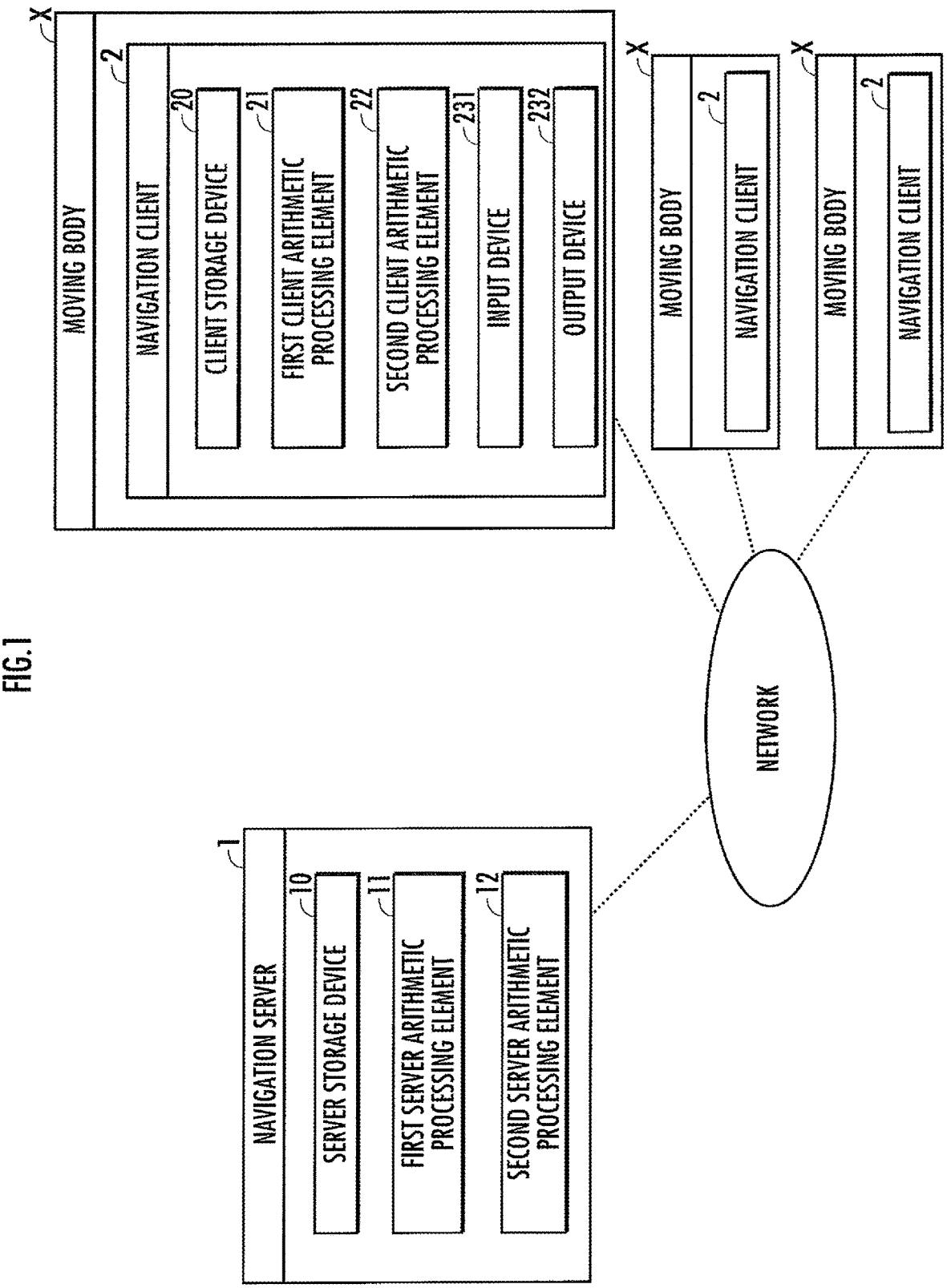
FIG. 1 is an explanatory drawing illustrating the configuration of a navigation server as one embodiment of the present invention.

A navigation system as one embodiment of the present invention that is illustrated in FIG. 1 is constituted by a navigation server 1 and a plurality of navigation clients 2. The navigation server 1 and the plurality of navigation clients 2 are each capable of performing intercommunication through one or a plurality of networks. The navigation client 2 is configured to be mounted in a moving body X that is an apparatus having a function of moving in accordance with a driving operation of a user, such as a vehicle that is a four-wheeled vehicle, a two-wheeled vehicle, a bicycle or the like. The term "mount" is a concept that also includes a case of being carried by a user that drives the moving body X.

(Configuration of Navigation Server)

The navigation server 1 comprises a server storage device 10, a first server arithmetic processing element 11 and a second server arithmetic processing element 12. The navigation server 1 may also be constituted by a portable terminal device such as a smartphone or a tablet.

The server storage device 10 is configured to store and hold received information such as "probe information" and an "operating state of a moving body" and arithmetic processing results such as a "first designated location" and a "designated location" that are calculation results from each of the first server arithmetic processing element 11 and the second server arithmetic processing element 12. In addition, the server storage device 10 is configured to store and hold road traffic information and server map information. The "road traffic information" includes a travelling cost and the like for respective links. The "server map information" includes, in addition to a position, a shape, an orientation or the like of each link constituting a road, which are represented with columns of coordinate values ((latitude, longitude) or (latitude, longitude, altitude)), link identification information for identifying each link and data representing attributes of the links and the like. The respective links are connected by nodes.

The first server arithmetic processing element 11 and the second server arithmetic processing element 12 each include a arithmetic processing unit (CPU) that reads software and data from a designated area of a memory constituting the server storage device 10 as needed, and then executes designated arithmetic processing that takes the data as an object in accordance with the software, and also include as needed a communication device and a storage device (memory) and the like. The details of the designated arithmetic processing are described later.

(Configuration of Navigation Client)

The navigation client 2 is constituted by a portable terminal device such as a smartphone or tablet. The term "portable" refers to, for example, a terminal device having a size that is approximately the standard palm size of a human, and a weight that can be easily carried around with one hand or in a pocket of a clothing. The navigation client 2 may also be constituted by a device that has a size and a weight that are greater than those of a portable device (for example, a device that is incorporated into a moving body).

The navigation client 2 comprises a client storage device 20, a first client arithmetic processing element 21 and a second client arithmetic processing element 22.

The client storage device 20 is configured to store and hold received information and arithmetic processing results such as calculation results from each of the first server arithmetic processing element 21 and the second server arithmetic processing element 22. The client storage device 20 is configured to store client map information. The "client map information" contains coordinate columns representing a position, a shape, an orientation and the like of each link constituting a road, and link identification information for identifying each link.

The first client arithmetic processing element 21 is configured to successively measure a present position $p_1$ of the navigation client 2 or the moving body X. The present position $p_1$ of the navigation client 2 may be measured based on a signal received from an artificial satellite by a GPS receiver or, as necessary, may be measured based on an output signal from a gyro sensor. The first client arithmetic processing element 21 is configured so as to separately detect an operation ON state (for example, an "ignition on" state) and an operation OFF state (for example, an "ignition off" state) of the moving body X based on communication with devices mounted in the moving body X. The first client arithmetic processing element 21 is configured to generate "probe information" representing operating states of the moving body X in addition to a chronological order of the position $p_1$ of the navigation client 2, and to transmit the probe information to the navigation server 1.

The second client arithmetic processing element 22 is configured to transmit a request to the navigation server 1, and to receive information corresponding to the request from the navigation server 1. The second client arithmetic processing element 22 is configured to search for a client route using the client map information, based on server route information.

The navigation client 2 further comprises an input device 231 and an output device 232. The input device 231 includes an operation button or a microphone, and enables various operations and the input of settings by a user operation or by an utterance of a user. The output device 232 includes a display device and an acoustic output device (speaker), and displays image contents such as client map information or outputs acoustic contents. The input device 231 and the output device 232 may include a touch-panel type display.

As used herein, the term "outputting" of information by a constituent element of the present invention refers to outputting information in any form which allows a human to recognize the information through the five senses of the human body, such as the sense of sight, the sense of hearing and the sense of touch, by displaying the information, audio output of the information or vibrational output of the information, or the like. Further, as used herein, a constituent element of the present invention being "configured" to execute arithmetic processing that is assigned to the constituent element means that the constituent element has a function to read a necessary program and data from a memory or the like, and to execute the assigned arithmetic processing in accordance with the relevant program based on the relevant data, and consequently means "programmed".

(Functions)

Figure 2:
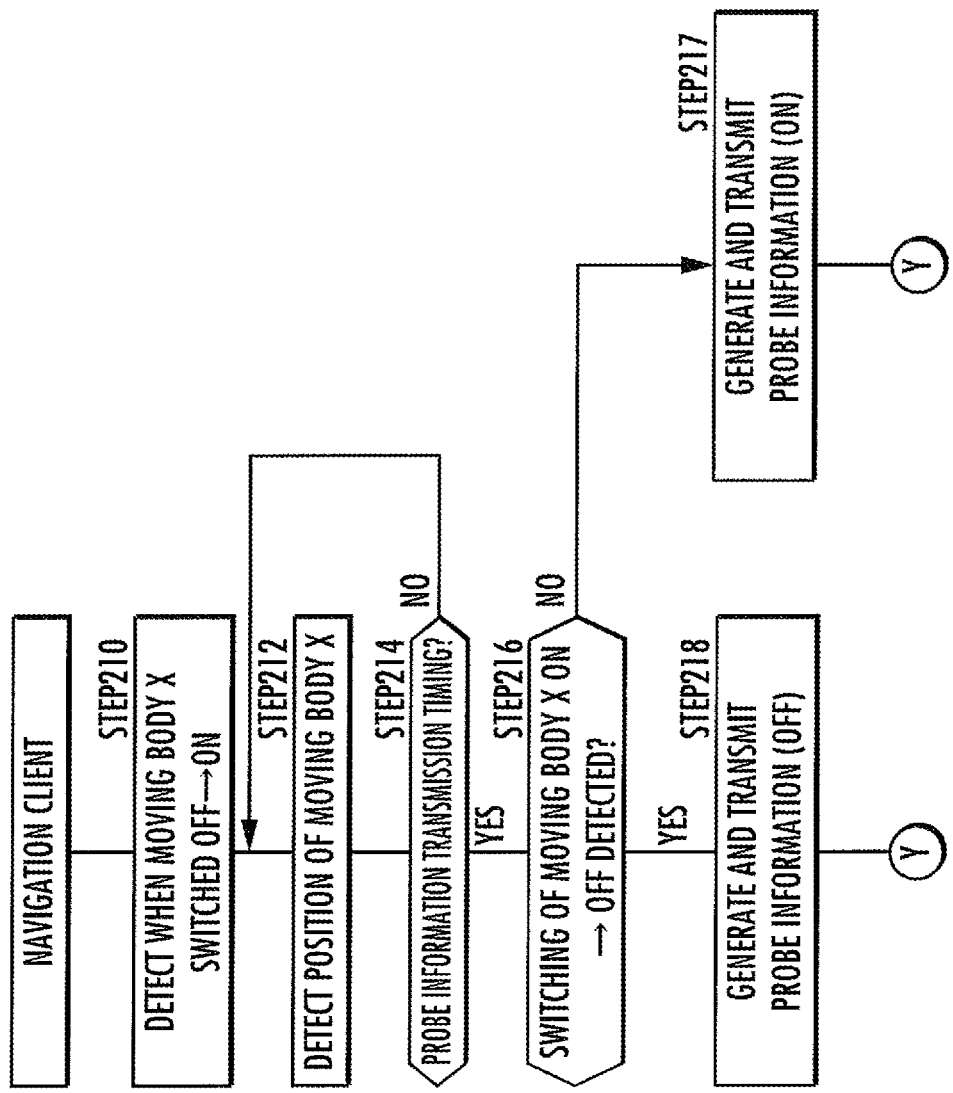
FIG. 2 is an explanatory drawing relating to functions of a navigation client.

Functions of the navigation system having the above configuration will now be described. The first client arithmetic processing element 21 in the navigation client 2 detects when the moving body X in which the navigation client 2 is mounted is switched from an operation OFF state to an operation ON state (FIG. 2/step 210). Thereafter, the first navigation client arithmetic processing element 21 successively detects the position of the moving body X (FIG. 2/step 212). The first navigation client arithmetic processing element 21 determines whether or not the current timing is a timing for transmitting probe information (FIG. 2/step 214). For example, the first navigation client arithmetic processing element 21 determines whether or not a condition such as a specified time period elapsing from the previous time that probe information was transmitted, or a travelling distance of the moving body since the previous time that probe information was transmitted reaching a specified distance, or the amount of probe information reaching a predetermined amount, has been satisfied.

If the first navigation client arithmetic processing element 21 determines that the current timing is a timing for transmitting probe information ("YES" in FIG. 2/step 214), the first navigation client arithmetic processing element 21 determines whether or not the moving body X has been switched from an operation ON state to an operation OFF state (FIG. 2/step 216).

If the first navigation client arithmetic processing element 21 determines that the moving body X has not been switched from an operation ON state to an operation OFF state ("NO" in FIG. 2/step 216), the first navigation client arithmetic processing element 21 generates probe information (first kind of probe information) which represents that the moving body X is in an operation ON state in addition to the chronological order of the positions of the moving body X, and transmits the probe information to the navigation server 1 (FIG. 2/step 217). If the first navigation client arithmetic processing element 21 determines that the moving body X has been switched from an operation ON state to an operation OFF state ("YES" in FIG. 2/step 216), the first navigation client arithmetic processing element 21 generates probe information (second kind of probe information) which represents that the moving body X is in an operation OFF state in addition to at least the position of the moving body X at that time point, and transmits the probe information to the navigation server 1 (FIG. 2/step 218). The probe information also includes identification information for identifying the navigation client 2 or the moving body X. The "position of the moving body X at a time point of switching between an operation 'on' state and an operation 'off' state" also includes a position of the moving body X that is measured by taking the switching detection as a measurement opportunity, in addition to positions of the moving body X that are measured immediately before and immediately after the switching.

Figure 3:
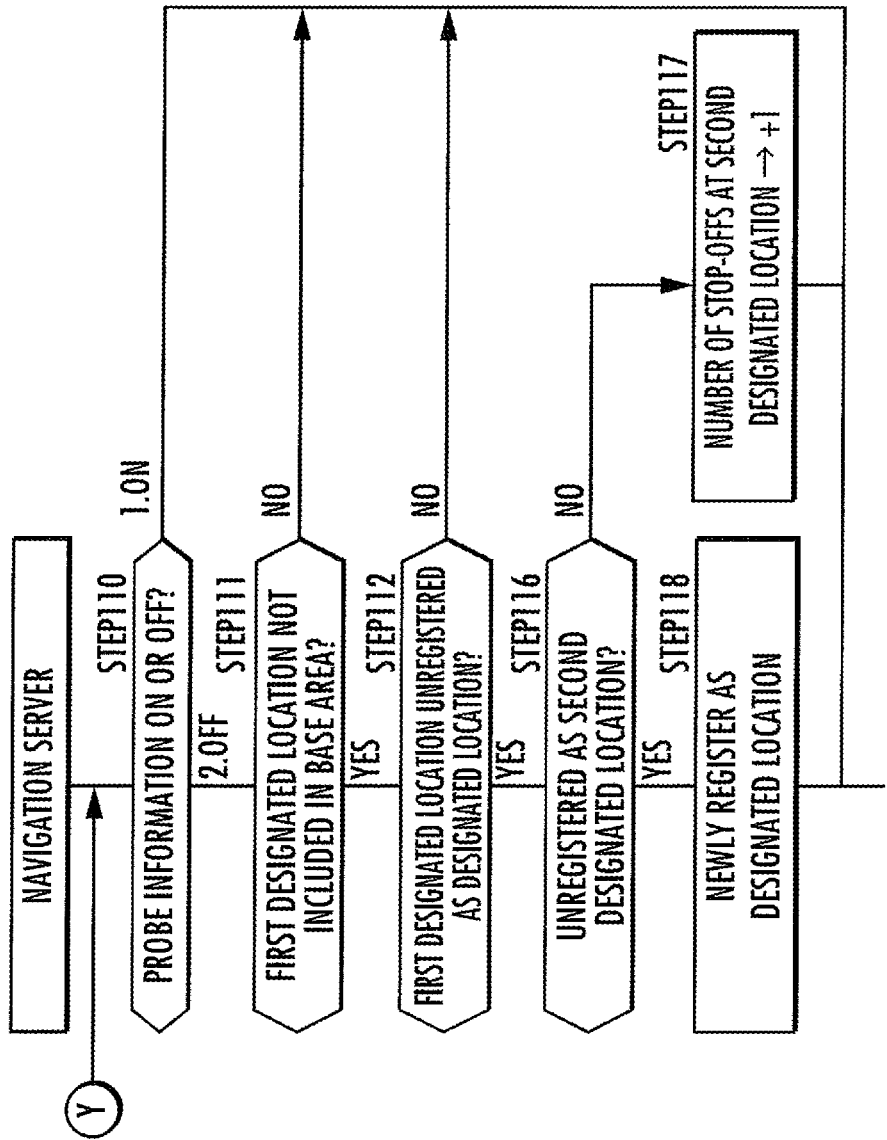
FIG. 3 is an explanatory drawing relating to functions of the navigation server.

In the navigation server 1, the first server arithmetic processing element 11 receives probe information transmitted from the navigation client 2, and determines whether the probe information indicates that the moving body X is in an operation ON state or an operation OFF state (FIG. 3/step 110). If the first server arithmetic processing element 11 determines that the probe information indicates that the moving body X is in an operation ON state ("1" in FIG. 3/step 110), the probe information is stored and held as it is in the server storage device 10. The first server arithmetic processing element 11 successively calculates or updates a travelling cost for the respective links based on probe information that is cumulatively held in the server storage device 10. A time required for travel, a travelling distance, a fuel consumption amount, a power consumption amount or a toll, or a combination of these, which are respectively measured for each link or predicted based on the relevant measurement result, is defined as the travelling cost for the relevant link. When calculating the travelling cost, road traffic information which the navigation server 1 receives from a server (not illustrated) that a road traffic information center manages may be used as supplementary information.

If the first server arithmetic processing element 11 determines that the probe information indicates that the moving body X is in an operation OFF state ("2" in FIG. 3/step 110), the first server arithmetic processing element 11 extracts a position of the moving body X at a time point that the moving body X switched from the operation ON state to the operation OFF state as a "first designated location", and the second server arithmetic processing element 12 determines whether or not the first designated location is included in a "base area" (FIG. 3/step 111).

The base area will now be described using FIG. 5. In the example illustrated in FIG. 5, locations Q0, Q1 and Q2 are each a stopping base which the user of the navigation client 2 or the moving body X that is identified by the identification information stops at on a daily basis, and the user travels back and forth between the stopping bases Q0 and Q1 by passing along a route R1, and also travels back and forth between the stopping bases Q1 and Q2 by passing along a route R2. The first server arithmetic processing element 11 adds up the frequency at which the moving body X is present at the respective locations based on probe information that is transmitted thereto from the navigation client 2 of the relevant user. The frequency at which the moving body X is present at the respective locations at a time point at which the moving body X switches between an operation ON state and an operation OFF state is evaluated as a "visiting frequency", and the frequency at which the moving body X is present at the respective locations at a time point at which an operation ON state of the moving body X is continuing is evaluated as a "passing frequency". As a result, the visiting frequency for each of the locations Q0, Q1 and Q2 and the passing frequency for each of a plurality of locations on the respective routes R1 and R2 are each evaluated as high values.

The first server arithmetic processing element 11 designates an area including a location for which the visiting frequency of the moving body X is equal to or greater than a first threshold value as a first base area, and designates an area including a location for which the passing frequency of the moving body X is equal to or greater than a second threshold value as a second base area. The first threshold value may be set to a lower value than the second threshold value.

Figure 5:
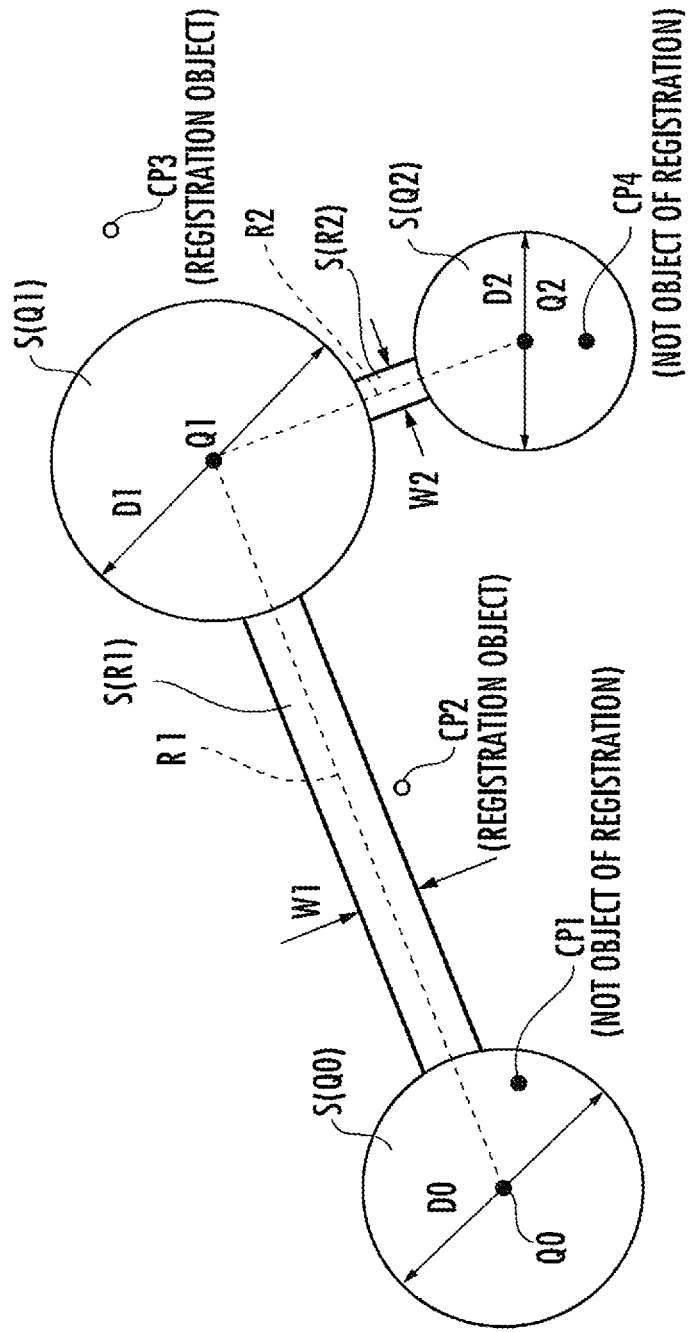
FIG. 5 is an explanatory drawing relating to a base area.

According to the example illustrated in FIG. 5, band-shaped areas in which circular areas which extend in a manner in which the circular areas are centered on each of a plurality of locations on the routes R1 and R2, respectively, are gathered together are designated as first base areas S(R1) and S(R2), respectively. Further, circular areas which extend in a manner in which the circular areas are centered on each of the stopping bases Q0, Q1 and Q2 are designated as second base areas S(Q0), S(Q1) and S(Q2), respectively. The two ends of the first base area S(R1) overlap with the second base areas S(Q0) and S(Q1), respectively. The two ends of the first base area S(R2) overlap with the second base areas S(Q1) and S(Q2), respectively.

A magnitude relation between respective widths W1 and W2 of the first base areas S(R1) and S(R2) is W1>W2. The magnitudes of the aforementioned widths are defined according to the level of the passing frequency of the moving body X in which the navigation client 2 is mounted. Note that the shape of the areas including respective passing locations constituting the first base areas may be, in addition to a circular shape that is centered on the relevant passing location, an elliptical shape, a triangular shape or a polygonal shape such as a quadrangular (rectangular, trapezoidal and the like) shape. The sizes (diameters in a case where the areas including the respective passing location are circular) of the areas constituting the first base areas may all be the same.

A magnitude relation between respective diameters D0, D1 and D2 of the second base areas S(Q0), S(Q1) and S(Q2) is D1>D0>D2. The magnitudes of the aforementioned diameters are defined according to the level of the visiting frequency of the moving body X in which the navigation client 2 is mounted. Note that the shape of the second base areas, may be, in addition to a circular shape that is centered on a base, an elliptical shape, a triangular shape or a polygonal shape such as a quadrangular (rectangular, trapezoidal and the like) shape. The sizes (diameters in a case where the second base areas are circular) of the second base areas may all be the same. The widths of all of the first base areas may be set to be smaller than the diameters of all of the second base area (in terms of this example, D2 may be greater than W1).

A configuration may be adopted in which a base area is received or recognized by the first server arithmetic processing element 11 by transmitting the base area to the navigation server 1 after being designated by the first client arithmetic processing element 21 or the second client arithmetic processing element 22 of the navigation client 2, instead of the first server arithmetic processing element 11 of the navigation server 1. A base area may also be set in accordance with an intention of a user through the input device 231 of the navigation client 2.

In a case where respective locations CP1, CP2, CP3 and CP4 illustrated in FIG. 5 are extracted as first designated locations, it is determined that the locations CP2 and CP3 are not included in any of the base areas. In contrast, it is determined that the locations CP1 and CP4 are included in one base area, respectively.

If the second server arithmetic processing element 12 determines that a first designated location is included in a base area ("NO" in FIG. 3/step 111), the "first designated location" is not stored and held as a designated location in the server storage device 10. In this case, the visiting frequency of the moving body X with respect to the base area or a base that is the basis for the base area is evaluated as a high value, and the relevant evaluation result may be used when setting a second base area as described above. If the second server arithmetic processing element 12 determines that a first designated location is not included in a base area ("YES" in FIG. 3/step 111), it is determined whether or not the relevant first designated location is unregistered as a designated location in the server storage device 10 (FIG. 3/step 112).

If the second server arithmetic processing element 12 determines that a first designated location is registered as a designated location in the server storage device 10 ("NO" in FIG. 3/step 112), the "first designated location" is not stored and held as a designated location in the server storage device 10. If the second server arithmetic processing element 12 determines that a first designated location is unregistered as a designated location in the server storage device 10 ("YES" in FIG. 3/step 112), the second server arithmetic processing element 12 further determines whether or not the first designated location is unregistered as a "second designated location" in the server storage device 10 (FIG. 3/step 116). A second designated location is, for example, a location (for example, a favorite location) that is designated in accordance with the intention of the user through the input device 232 of the navigation client 2, and the first server arithmetic processing element 11 receives the second designated location from the navigation client 2 and stores and holds the second designated location in the server storage device 10. A second designated location may also be calculated by the second server arithmetic processing element 12 as a position of a location or area at which a number of stop-offs of the moving bodies X of many and unspecified users exceeds a threshold value. In a case where the second server arithmetic processing element 12 determines that a first designated location is registered as a second designated location in the server storage device 10 ("NO" in FIG. 3/step 116), the second server arithmetic processing element 12 increments the number of stop-offs (or the number of visits) for the relevant second designated location by one, and then stores the incremented number of stop-offs in the server storage device 10 (FIG. 3/step 117).

If the second server arithmetic processing element 12 determines that the first designated location is unregistered as a second designated location in the server storage device 10 ("YES" in FIG. 3/step 116), the first designated location is stored and held as a "designated location" in the server storage device 10 (FIG. 3/step 118). A new designated location is registered in the server storage device 10 in a form in which the new designated location is added to a designated location list in which a plurality of designated locations are listed.

Figure 4:
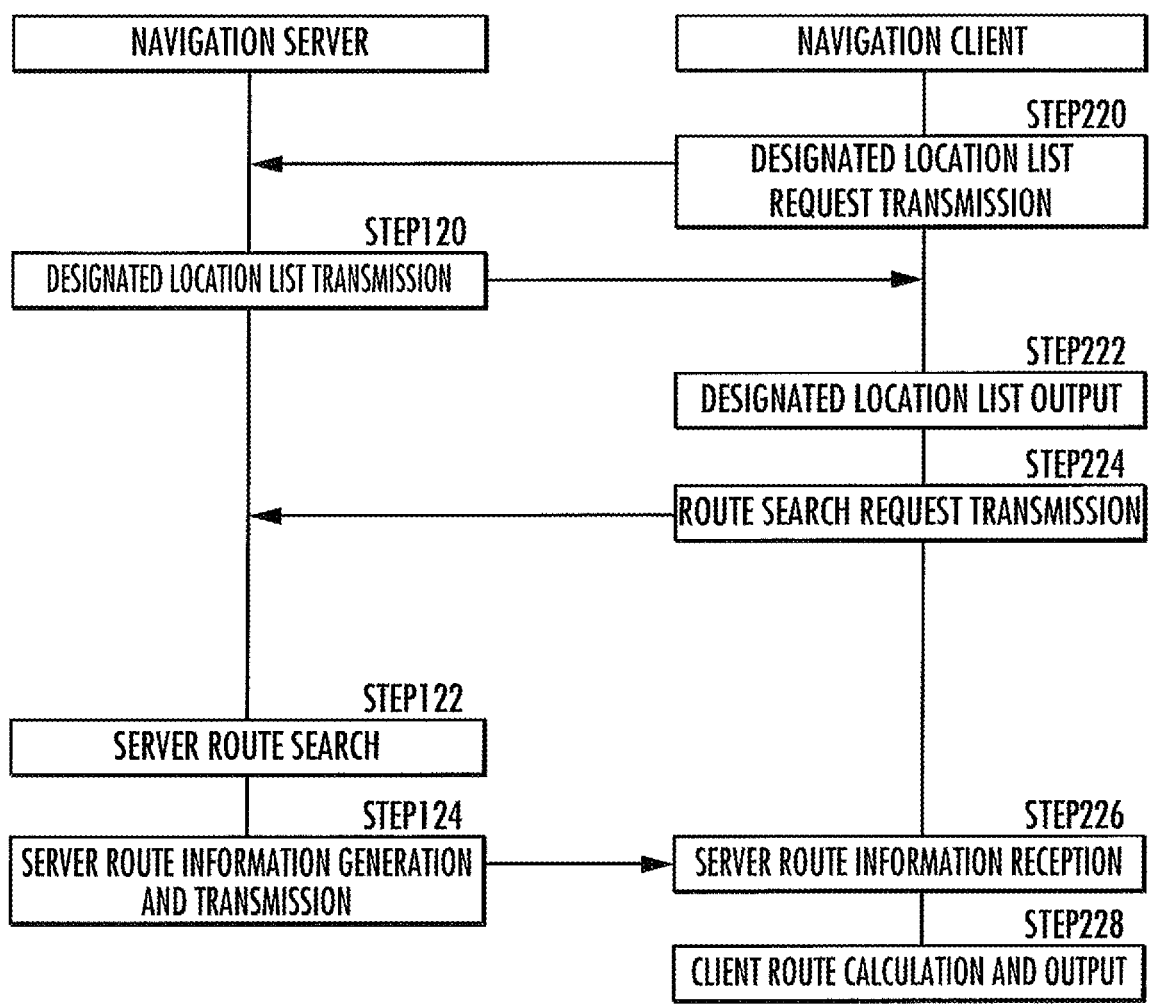
FIG. 4 is an explanatory drawing relating to functions of a navigation system.

At the navigation client 2, the second client arithmetic processing element 22 transmits a request for the designated location list to the navigation server 1 (FIG. 4/step 220). The relevant request is transmitted to the navigation server 1 by taking a fact that predetermined application software in the navigation client 2 is started by an operation of the input device 231 or that a predetermined operation is performed through the input device 231 in accordance with an operation screen displayed on the output device 232 as an opportunity to transmit the request. Identification information of the navigation client 2 or the moving body X is included in the relevant request.

Figure 6:
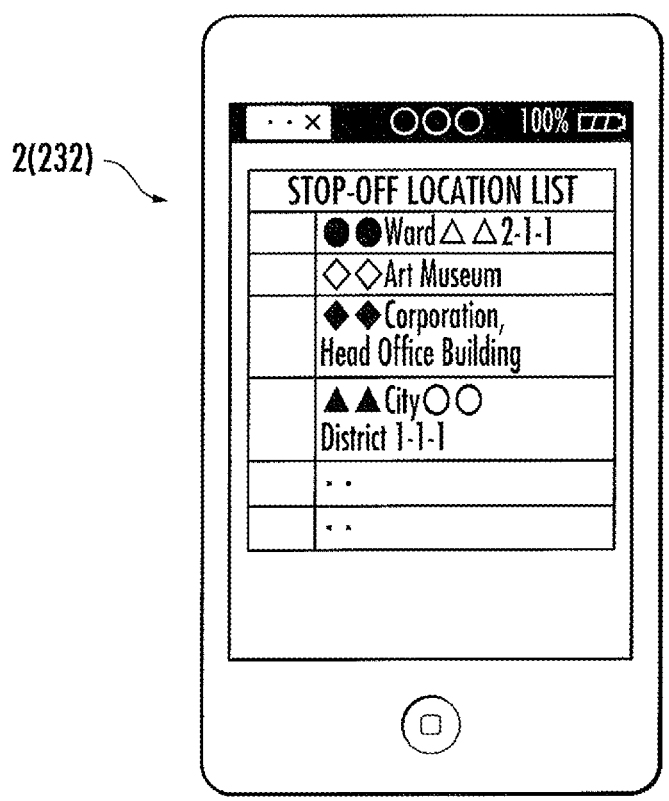
FIG. 6 is an explanatory drawing relating to an output form of a designated location list.

At the navigation server 1, the second server arithmetic processing element 12 receives the request, and searches the server storage device 10 for a designated location list for the moving body X identified by the identification information included in the relevant request, and transmits the designated location list that is retrieved to the navigation client 2 (FIG. 4/step 120). At the navigation client 2, upon receiving the designated location list, the second client arithmetic processing element 22 causes the output device 232 to output the designated location (FIG. 4/step 222). Thereby, for example, as illustrated in FIG. 6, a list in which a plurality of designated locations is listed is displayed on a display device constituting the output device 232.

Similarly, a first designated location list which lists first designated locations that have not been registered as designated locations because the respective first designated locations are included in a base area may be provided from the navigation server 1 to the navigation client 2 (see "NO" in FIG. 3/step 111). A second designated location list in which second designated locations are listed may also be provided from the navigation server 1 to the navigation client 2 (see FIG. 3/step 116).

A configuration may also be adopted in which transmission of a request for the designated location list and displaying of a list in response to the request are executed through an information terminal other than the navigation client 2. In a case where the other information terminal is a portable terminal constituting the navigation server 1, or in a case where the relevant request was made in accordance with an operation of a user at the relevant portable terminal, the designated location list may be listed on a display device of the relevant terminal.

At the navigation client 2, one designated location from among a plurality of designated locations listed in the list is selected as a destination location $p_2$ by the user through the input device 231. In response to selection of the destination location $p_2$, the second client arithmetic processing element 22 sends a route search request to the navigation server 1 (FIG. 4/step 224). The request includes a departure location $p_1$ and the destination location $p_2$ of the navigation client 2 (more precisely, coordinate values representing the relevant locations or link identification information). The present location of the navigation client 2 at the time point at which the destination location $p_2$ is set or which is measured immediately therebefore, or a location that is set by the user through the input device 231 is used as the departure location $p_1$. The request further includes identification information of the navigation client 2 or the moving body X.

Figure 7:
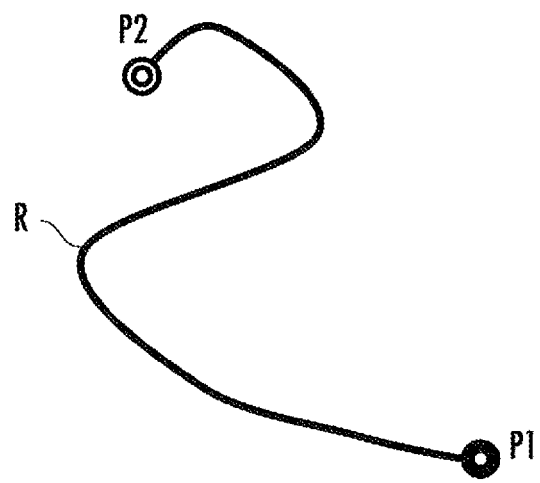
FIG. 7 is an explanatory drawing relating to a searching method of a server route.

The second server arithmetic processing element 12 in the navigation server 1 receives the request, and searches for one or a plurality of server routes R which are constituted by a plurality of link groups that link the departure location $p_1$ and the destination location $p_2$ of the navigation client 2 (FIG. 4/step 122). Thereby, a server route R as shown in FIG. 7 is obtained as a search result. When searching for the server route R, the server map information and travelling cost with respect to each link are used. A route on which the total travelling cost is lowest is retrieved as the server route R.

The second server arithmetic processing element 12 generates server route information that represents the server route R, and then transmits the server route information to the navigation client 2 (FIG. 4/step 124). The "server route information" includes link identification information for at least some links among a series of link groups constituting the server route R, or coordinate values for each of a discrete plurality of locations that are on the server route R.

The second client arithmetic processing element 22 in the navigation client 2 receives the server route information (FIG. 4/step 226). Based on the server route information, the second client arithmetic processing element 22 uses the client map information to calculate a client route r that links the departure location $p_1$ (or an up-to-date present location that is a position after the time point at which the destination location $p_2$ was set), and then outputs the client route r to the output device 232 (FIG. 4/step 228).

Figure 8:
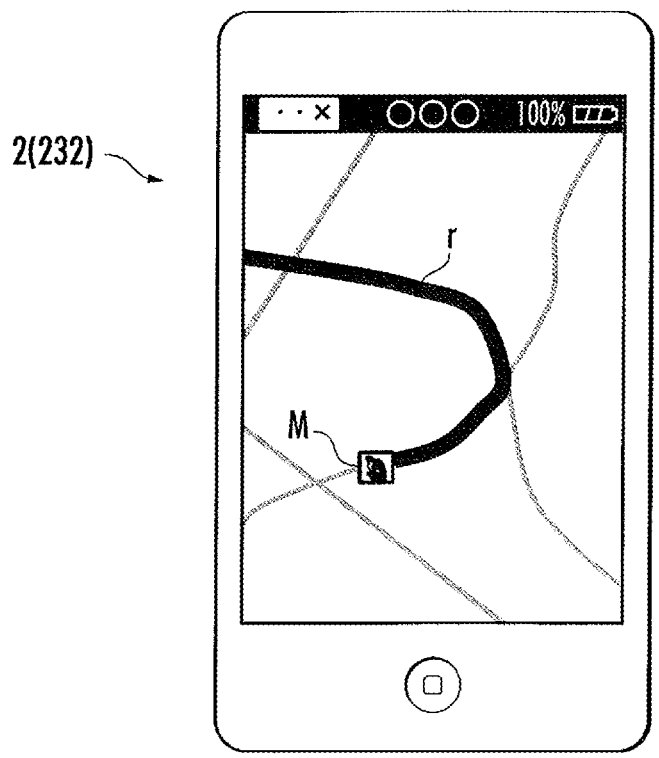
FIG. 8 is an explanatory drawing relating to an output form of a client route.

For example, the client route r is searched for so as to include a plurality of locations represented by coordinate values or a link identified by link identification information included in the server route information (so that at least some of the server route R is reproduced). Thereby, as illustrated in FIG. 8, the client route r is superimposed on the client map together with a marker M that represents the present location $p_1$ of the navigation client 2, and is displayed on the display constituting the output device 232.

(Working Effects)

According to the navigation server 1 and the like of the present embodiment, a position of the moving body X at a time point of switching between an operation ON state and an operation OFF state is extracted as a "first designated location" from among the chronological order of positions (probe information) of the moving body X that is transmitted from the navigation client 2 (see FIG. 3/step 110). When the moving body X was switched from an operation ON state to an operation OFF state, the probability that immediately thereafter the user of the moving body X stopped off at the location or an area in the vicinity thereof is high. That is, there is a high probability that the location is a movement-pausing location or a destination location. Therefore, by extracting the first designated locations, it is possible to identify with high accuracy a location at which the moving body X or the user thereof stopped off.

Further, after a designated location is extracted from among the first designated locations of the moving body X based on the requirement that the designated location is outside a base area of the moving body X, the designated location is stored and held or registered in the server storage device 10 (see FIG. 3/step 111 and step 118). An area which includes a location which the user stops off on a daily basis or frequently is designated as a base area. Specifically, based on probe information of the moving body X, a first base area that includes a location with respect to which a passing frequency of the moving body X is equal to or greater than a first threshold value, and a second base area that includes a location in which a visiting frequency of the moving body X is equal to or greater than a second threshold value are set as base areas (see S(Q0), S(Q1), S(Q2), S(R1) and S(R2) in FIG. 5). Thereby, a position of a location which the user stops off on a non-daily or occasional basis is registered as a designated location (see FIG. 5/CP2 and CP3). Further, in a situation where a designated location is set as a new destination location and a route search is performed, the usefulness of information relating to the relevant designated location for the user can be improved (see FIG. 4/step 224 and FIG. 8).

The first base area is set to a narrower area than the second base area. For example, a width Wi of a first base area S(Ri) (i=1, 2) in FIG. 5 is set narrower than a diameter Dj of a second base area S(Qj) (j=0, 1, 2). Thereby, a narrow base area is actualized in a case where the passing frequency of the user at a certain location is higher in comparison to a case where the visiting frequency of the user at the certain location is higher. Therefore, in a case where a user occasionally stops off at a location that is separated by only a short distance (see FIG. 5/CP2) from a location which is merely a location that the user passes on a daily basis, the possibility of the position of the location which the user occasionally stops off being excluded from designated locations, can be decreased.

Other Embodiments of Present Invention

Although in the above described embodiment a position of the moving body X at a time point of switching from an operation ON state to an operation OFF state is extracted as a first designated location, a configuration may also be adopted in which a position of the moving body X at a time point of switching from an operation OFF state to an operation ON state is extracted as a first designated location.

In a case where the moving body X was switched from an operation OFF state to an operation ON state, there is a high probability that immediately prior thereto the user of the moving body X had been stopping off at the relevant location or an area in the vicinity thereof. That is, there is a high probability that the relevant location is a movement starting location or a departure location. Therefore, by extracting the first designated locations, it is possible to identify with high accuracy a location at which the moving body or the user thereof stopped off.

Although in the above described embodiment, in the process of registering a first designated location as a new designated location, it is determined whether or not the first designated location is registered in the server storage device 10 as a second designated location (for example, a "favorite location" or a highly popular location") (see FIG. 3/step 116), a configuration may also be adopted in which the aforementioned determination is omitted.

What is claimed is:

1. A navigation server, comprising:
at least one processor; and
at least one memory including computer program code,
wherein the at least one memory and the computer program code are configured to, with the at least one processor, cause the navigation server at least to:
receive a chronological order of positions and operating states of a moving body in which a navigation client is mounted from the navigation client;
repeatedly extract a position of the moving body at a time point of switching between an operation ON state and an operation OFF state from among the chronological order of positions of the moving body as a first designated location;
extract as a designated location of the moving body, a location satisfying a requirement of being outside of a base area that is specific to the moving body from the first designated locations extracted by the navigation server, and thereafter cause the designated location to be stored in the at least one memory;
receive departure location information of the moving body;
generate a server route between the departure location and the designated location, wherein the server route comprises link identification information for a portion of the links among a series of link groups constituting the server route, and
recognize as the base area, based on the chronological order of positions of the moving body received from the navigation client, a first base area which includes a location in which a passing frequency of the moving body is equal to or greater than a first threshold value, and a second base area which includes a location in which a visiting frequency of the moving body is equal to or greater than a second threshold value,
wherein the passing frequency of the moving body is a frequency at which the moving body is present at a respective location of a plurality of locations in the first base area at a time point at which the operation ON state of the moving body is continuing.

2. The navigation server according to claim 1, wherein the at least one memory and the computer program code are configured to, with the at least one processor, cause the navigation server at least to:
recognize the base area under at least one condition of a condition that the first threshold value is lower than the second threshold value and a condition that the first base area is narrower than the second base area.

3. The navigation server according to claim 1, wherein the at least one memory and the computer program code are configured to, with the at least one processor, cause the navigation server at least to:
store and hold a second designated location that is designated by a user of the navigation client in addition to the designated location of the moving body; and
extract the designated location based on a further requirement that the designated location is not stored and held as either one of the designated location and the second designated location by the at least one memory.

4. The navigation server according to claim 1, wherein the at least one memory and the computer program code are configured to, with the at least one processor, cause the navigation server at least to:
cause the navigation client or an information terminal other than the navigation client to output the designated locations, and thereafter cause the designated location to be selected, and to cause the designated location that is selected to be stored in the at least one memory as a second designated location of the moving body.

5. The navigation server according to claim 1, wherein: the base area is an area including a location where a user stops off on a daily basis or frequently.

6. A navigation client that is mounted in a moving body, comprising:
at least one processor; and
at least one memory including computer program code,
wherein the at least one memory and the computer program code are configured to, with the at least one processor, cause the navigation client at least to:
recognize a chronological order of positions and operating states of the moving body;
transmit to a navigation server, in a distinguishable form, a plurality of positions at time points immediately after switching between an operation ON state and an operation OFF state of the moving body and positions at other time points;
receive a server route that identifies a route between a departure location of the navigation client and a designated location of the navigation client;
with the server route, generate a client route linking the departure location; and
output the client route to an output device,
wherein the navigation server recognizes as a base area, based on the chronological order of positions of the moving body, a first base area which includes a location in which a passing frequency of the moving body is equal to or greater than a first threshold value, and a second base area which includes a location in which a visiting frequency of the moving body is equal to or greater than a second threshold value,
wherein the passing frequency of the moving body is a frequency at which the moving body is present at a respective location of a plurality of locations in the first base area at a time point at which the operation ON state of the moving body is continuing, and
wherein the designated location is a location satisfying a requirement of being outside of a base area that is specific to the moving body from the plurality of positions.

7. A navigation system, comprising:
a navigation server; and
a navigation client,
wherein, the navigation server comprises:
at least one processor; and
at least one memory including computer program code,
wherein the at least one memory and the computer program code are configured to, with the at least one processor, cause the navigation server at least to:
receive a chronological order of positions and operating states of a moving body in which a navigation client is mounted from the navigation client;
extract a position of the moving body at a time point of switching between an operation ON state and an operation OFF state from the chronological order of positions of the moving body as a first designated location;
extract as a designated location of the moving body, a location satisfying a requirement of being outside of a base area that is specific to the moving body from among the first designated locations extracted by the navigation server, and thereafter cause the designated location to be stored in the at least one memory;
receive departure location information of the moving body;
generate a server route between the departure location and the designated location, wherein the server route comprises link identification information for a portion of the links among a series of link groups constituting the server route; and
recognize as the base area, based on the chronological order of positions of the moving body received from the navigation client, a first base area which includes a location in which a passing frequency of the moving body is equal to or greater than a first threshold value and a second base area which includes a location in which a visiting frequency of the moving body is equal to or greater than a second threshold value,
wherein the passing frequency of the moving body is a frequency at which the moving body is present at a respective location of a plurality of locations in the first base area at a time point at which the operation ON state of the moving body is continuing, and
wherein the navigation client comprises:
at least one second processor; and
at least one second memory including computer program code,
wherein the at least one second memory and the computer program code are configured to, with the at least one second processor, cause the navigation client at least to:
recognize a chronological order of positions and operating states of the moving body, and to transmit to a navigation server, in a distinguishable form, a position at a time point immediately after switching between an operation ON state and an operation OFF state of the moving body and positions at other time points.

* * * * *